United States Patent [19]

Ash

[11] 4,387,777

[45] Jun. 14, 1983

[54] CALORIE COUNTING METHOD AND APPARATUS

[75] Inventor: Stephen R. Ash, LaFayette, Ind.

[73] Assignee: Willo Partners, Aurora, Ill.

[21] Appl. No.: 315,246

[22] Filed: Oct. 26, 1981

[51] Int. Cl.³ ............... G01G 23/22; G01G 23/14; G01G 3/00; G01G 1/18; G01G 21/22
[52] U.S. Cl. .................................. 177/43; 177/1; 177/170; 177/225; 177/251; 177/262
[58] Field of Search .................. 177/43, 44, 170, 1, 177/225, 230, 251, 262, 263, 246

[56] References Cited

U.S. PATENT DOCUMENTS

| | | | |
|---|---|---|---|
| 2,314,387 | 3/1943 | Carlsson | 177/34 X |
| 2,360,384 | 10/1944 | Quidas | 177/44 |
| 3,382,941 | 5/1968 | Novak | 177/1 |
| 3,387,676 | 6/1968 | Porter | 177/245 X |

FOREIGN PATENT DOCUMENTS

| | | | |
|---|---|---|---|
| 1800864 | 6/1970 | Fed. Rep. of Germany | 177/225 |
| 1376445 | 12/1974 | United Kingdom | 177/170 |

Primary Examiner—George H. Miller, Jr.
Attorney, Agent, or Firm—Mason, Kolehmainen, Rathburn & Wyss

[57] ABSTRACT

Caloric counting method and apparatus comprises a base support structure, a plate support structure pivotally mounted on the base support structure, and scale means connected to said plate support structure at a point remote from the pivot line thereof. A plate carrying a combination of food components constituting an entire meal is positioned on the plate support structure to determine the total caloric content of the entire meal. The plate is provided with indicia defining different zones on the plate for foods having different calories per gram, these zones being arranged so that the zone corresponding to foods having the least calories per gram is positioned nearest the pivotal mounting of the plate support structure when the plate is positioned thereon. The patient places the food components constituting an entire meal in the correct zones on the plate and the total caloric content of the entire meal is determined in a single operation by reading the scale which is calibrated in calories.

15 Claims, 6 Drawing Figures

U.S. Patent   Jun. 14, 1983   Sheet 1 of 2   4,387,777
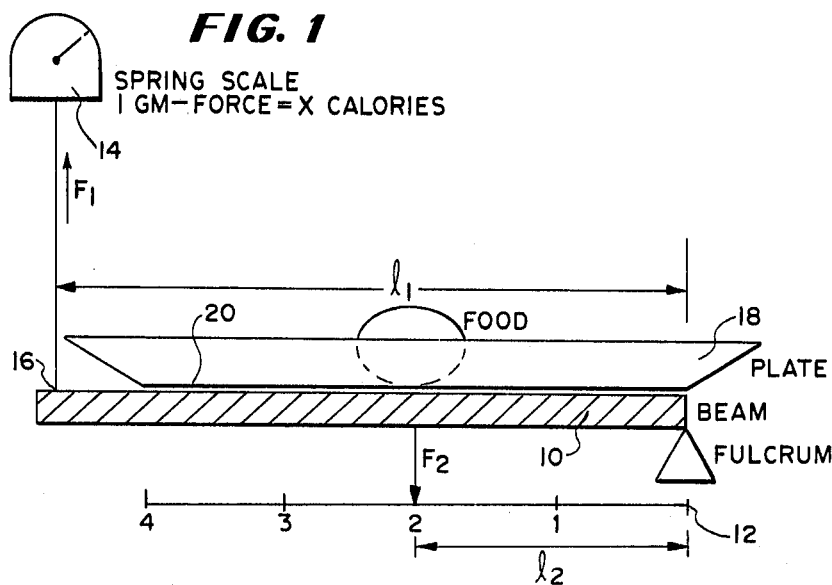
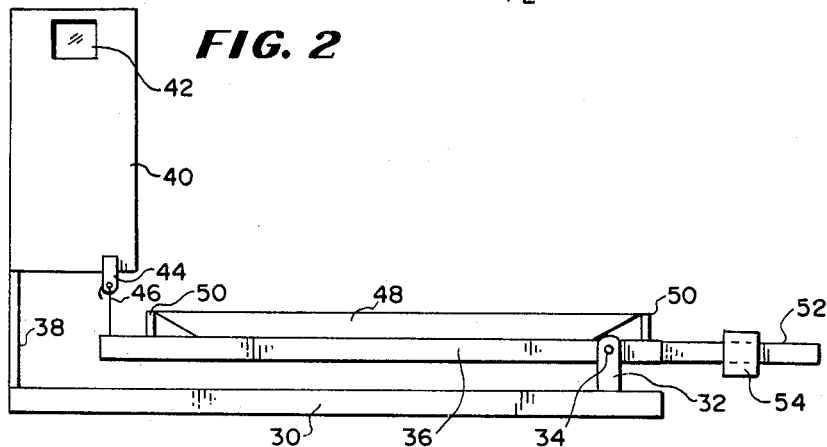
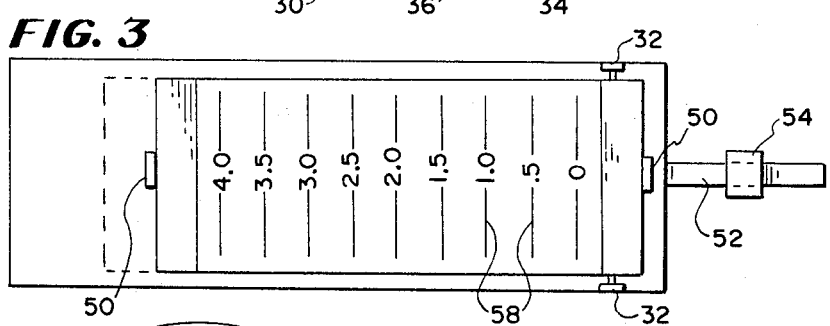
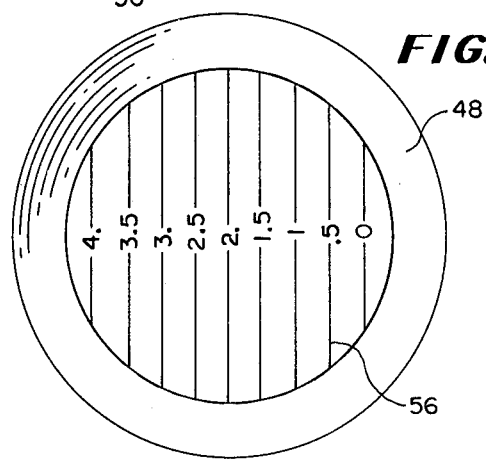
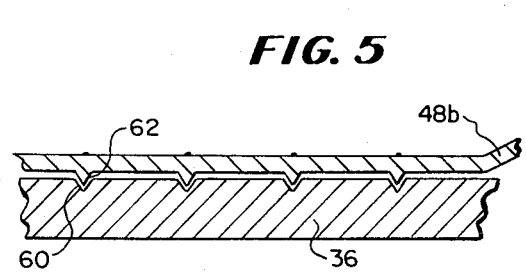

CALORIE COUNTING METHOD AND APPARATUS

BACKGROUND OF THE INVENTION

1. Field of the Invention

This invention relates to weighing devices for determining the number of calories in a combination of food components in a single operation. The invention is related to the calorie counting device disclosed in Ash application Ser. No. 505,622 filed Sept. 13, 1974, now abandoned.

2. Description of the Prior Art

Obesity is one of the major health problems in our society today. It is estimated that thirty million Americans are overweight. Obesity is associated with cardiovascular disease, hypertension, diabetes mellitus, gall stones, arthritis, gout and menstrual abnormalities. In addition, social stigmata and decreased self-image accompany obesity.

With these facts in mind, Americans have become quite diet conscious and it is estimated that thirty percent of the American public attempts some sort of calorie control each year. A variety of diets have been generated in which the number or types of food are restricted, or food is exchanged within food groups of similar caloric content.

One method of calorie counting is presently accomplished by generally estimating the size of food, for example, a piece of steak ¼"×2"×3" or a medium-sized chop, or a small tomato or a large celery stalk approximately eight inches long, before looking up the number of calories therein in a book listing the calories in the common foods. This method of calorie counting is inherently inaccurate due to the estimate required and is time consuming and tedious due to the requirements for looking up each separate food in a calorie listing book.

More accurate calorie counting methods include measurement of weight or volume of food and multiplication by caloric content, as described in various publications. All of these methods have severe limitations in practice. Measurement of food by volume is cumbersome, inaccurate and somewhat messy. Furthermore, since recent studies have shown that fifty percent of American meals are eaten out of the home, proper diet control has to be flexible enough to incorporate and estimate calorie content of foods when eating out.

There have, of course, been many prior attempts to weigh calories and foods. However, a specific advantage of this invention is the fact that an entire meal can be placed on any plate as it normally would be and then the total caloric content of the meal may be determined. The only non-normal procedure that must be followed is that the food must be placed in predetermined positions on the plate, which is really not a major inconvenience. This method is, of course, more efficient, more accurate and more convenient than previous methods such as those described in Novak U.S. Pat. No. 3,382,941, Porter U.S. Pat. No. 3,387,676 and Carlsson U.S. Pat. No. 2,314,387. German Pat. No. 2,114,451 discloses an arrangement in which the caloric content of various types of foods may be obtained. However, in this arrangement a series of separate individual containers and scales are provided, one for each food having a specific percent calorie content.

SUMMARY OF THE INVENTION

This invention relates to an apparatus and method for determining the total caloric content of a combination of food components constituting an entire meal. The apparatus comprises a base support structure, a plate support structure pivotally mounted on the base support structure and scale means connected to said plate support at a point remote from the pivot line thereof. A plate carrying a combination of food components constituting an entire meal is positioned on the plate support structure to determine the total caloric content of the entire meal. Either the plate itself, or the plate support structure, or both, is provided with suitable indicia which define different zones on the plate for foods having different calories per gram, these zones being arranged so that the zone corresponding to the food having the least calories per gram is positioned nearest the pivotal mounting of the plate support structure when the plate is mounted thereon, these zones extending away from the pivotal mounting toward the remote point at which the scale means is connected. The user has simply to place the food components constituting a desired meal in the correct zones on the plate corresponding to caloric density of that particular food component. The scale means is calibrated in calories so that the total caloric content of the entire meal may be determined in a single operation.

The arrangement of the present invention thus allows patients to place various amounts and types of food on a plate to produce a meal of the proper total caloric conent. For example, a diabetic patient may wish to place 800 calories on a plate for one meal, whereas a patient desiring to lose weight may be able to place only 400 calories on the plate. The accuracy of determination of total caloric content is determined by the accuracy of the scale mechanism and the accuracy of placement of food on the plate by the patient. Pictures representative of various food types which are correlated with caloric density thereof or a sample table may be followed by the patient in placing the food on the plate. Using the plate-scale arrangement of the present invention it is possible for patients to accurately control their caloric intake. In addition, the scale is educational in that by re-weighing several possible combinations of food, the patient will find those foods which are most satisfying to him and which have the lowest caloric content.

The invention, both as to its organization and method of operation, together with further objects and advantages thereof will best be understood by reference to the following specification taken in connection with the accompanying drawings:

BRIEF DESCRIPTION OF THE DRAWINGS

FIG. 1 is a diagrammatic illustration of one basic arrangement of the present invention;

FIG. 2 is a side-elevational view of an alternative embodiment of the invention;

FIG. 3 is a top plan view of the arrangement of FIG. 2;

FIG. 4 is a top plan view of a plate suitable for use in the arrangement of either FIG. 1 or FIG. 2;

FIG. 5 is a sectional view taken along the lines 5—5 of FIG. 4; and

Figure 6:
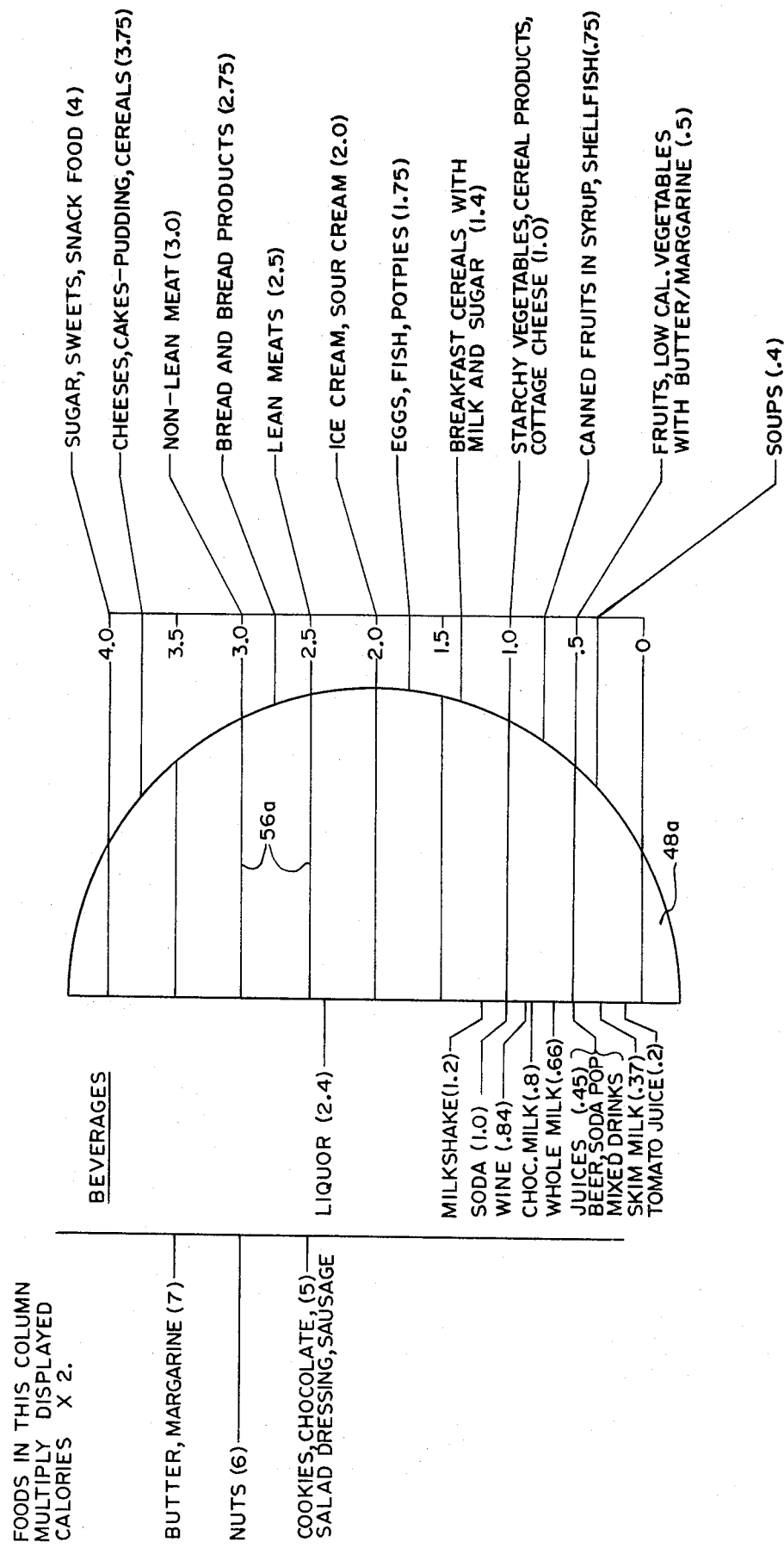
FIG. 6 is a food-caloric density chart which is used in connection with the present invention.

Referring now to the drawings, and more particularly to FIG. 1 thereof, the dietary scale arrangement of the present invention is therein illustrated as consisting of a lever system of the third class which includes a beam 10 which is supported at one end by means of the fulcrum 12. A spring scale 14 is connected to the beam 10 at the point 16 remote from the fulcrum 12 and exerts an upward force $F_1$ on the outer end of the beam 10. A plate 18 is arranged to be positioned on the beam 10 and food is placed on the plate 18 in different zones corresponding to the caloric density of different food components of the meal.

In the embodiment illustrated in FIG. 1 foods having caloric content ranging from zero to 4 calories per gram may be placed on the plate 18. The scale 14 is then calibrated to read four calories for each gram of food which is placed in the area 20 nearest the scale end of the beam 10.

The torque exerted by the weight of any food on the beam is equal to the weight of the food ($F_2$) times the distance $l_2$ from the fulcrum 12. In the illustrated embodiment this distance is measured with four units equal to the maximum food position away from the fulcrum 12 on the flat bottom portion of the plate 18 so that foods having from zero to 4 calories per gram may be accommodated. The torque due to the food is counterbalanced by the torque of the spring in the scale 14, i.e., $F_1$ times $l_1$.

This force is converted to calories with a constant relationship between calories and torque, the torque of food at the farthest position from the fulcrum being four times weight. Any food placed between the fulcrum and the maximum position on the flat bottom portion of the plate will have a caloric reading of less than four calories per gram. The effective force on the scale will be proportional to the torque exerted by the weight of the food, which is in turn proportional to the weight of the food times the lever arm distance. Accordingly, the scale 14 which is calibrated in calories, can indicate the total caloric content of the entire meal placed on the plate 18. A food-caloric density chart or diagram can be used to indicate the proper location on the plate for each type of food depending upon its caloric density, i.e., calories per gram, as will be described in more detail hereinafter.

The torque due to the weight of the empty plate 18 may be subtracted from the total torque reading by any suitable counter-balancing means, such as a mechanical zero adjust on the spring scale 14, as will be readily understood by those skilled in the art.

In FIG. 2 an alternative dietary scale arrangement in accordance with the present invention is provided wherein a base member 30 is provided with a pair of upstanding ears 32 in which a rod 34 is mounted so as to pivotally support one end of a plate supporting member 36. The base member 30 includes a pair of uprights 38 which support an electronic scale 40 of the type customarily used for bathroom scales, the scale 40 including a digital readout indicator 42 which is calibrated in calories. Preferably the digital readout indicator 42 is of the linear voltage differential transformer type which is connected to the movable element of the scale 40 and translates the position of the LVDT into a corresponding digital signal which can be displayed on any suitable digital display arrangement such as an array of LED's. Such an LVDT type scale is employed in Model ES-1 commercial bathroom scale manufactured by Moulinex Co. of Virginia Beach, VA. Specifically, the printed circuit board of this scale, which is manufactured by Management Investment Technology Co., Ltd. of Hong Kong, as Board No. ES-885 can be employed as the readout indicator 42. The input member 44 of the scale 40 is connected to the free end of the plate support member 36 by means of the hook 46.

A plate 48 may be positioned on the pivotally mounted support member 36 between the upstanding lugs 50 formed in the plate support member 36, these lugs acting to position the plate 48 correctly with respect to the pivot rod 34. In order to counter-balance the weight of the plate 48, an extension 52 is provided on the plate support member 36 which extends beyond the pivot rod 34 and carries a slidable weight 54 which may be adjusted to counter-balance the weight of different types of plates. In the alternative, the digit readout indicator 42 may include facilities for substracting out the weight of the plate 18. For example, the empty plate 18 may be placed on the support 10 and the readout indicator 42 set to zero by pressing a suitable push button. With either the mechanical or electronic counter-balancing arrangement plates or other food supporting structures of different sizes and shapes may readily be employed while still obtaining accurate total caloric content readings.

The plate 48 may have a series of parallel lines 56 (FIG. 4) inscribed in the upper surface thereof which define parallel food receiving zones which are adapted to receive foods of different caloric density. In addition, suitable indicia may be inscribed in connection with each of the lines 56 to indicate the caloric density of a particular food receiving zone, as shown in FIG. 4. If desired, the upper surface of the plate suport member 36 may be similarly inscribed with the parallel lines 58 which define food receiving zones corresponding to foods of different caloric densities. In this connection, it will be understood that the plate 48 is placed on the support member 36 with the food receiving zone corresponding to the least calories per gram adjacent the pivotally supported end of the plate support member 36, as described heretofore in connection with FIG. 1. The transversely extending lines 56 and their associated indicia facilitate the placement of the plate 48 on the support 36 with the correct orientation relative to the pivot rod 34.

With the arrangement of the present invention the user may center a desired portion of food of a given caloric density along the line corresponding to the exact calories/gram of that food component by visual alignment of the food mass with one of the desired lines 58. Also, the mass of food may be centered along a desired line between two of the lines 56 so that very fine graduations of caloric density may be accommodated with the result that an accurate indication of total caloric content of the meal is made possible. Furthermore, a cup of beverage of given caloric density may be accurately placed on the plate 48 by visual alignment with the lines 56 or, in the alternative, may be placed directly on the supporting member 36 and accurately locted by visual alignment with the lines 58.

In accordance with a further aspect of the present invention, the upper surface of the plate supporting member 36 may be provided with transversely extending grooves 60 which are arranged to interlock with corresponding ridges 62 on the bottom of the plate 48b, as shown in FIG. 5. In this embodiment, the plate 48b may, if desired, have the lines 56 and corresponding indicia inscribed in the upper surface thereof, in a manner similar to FIG. 4. The cooperating grooves 60 and ridges 62 insure that the plate 48b is accurately located on the supporting member 36. When such grooves and ridges are employed, the lugs 50 of FIG. 2 may be eliminated.

The dietary scale of the present invention may also be used for very high caloric foods if the scale is re-calibrated to represent, for example, eight calories per gram at the highest caloric density food position. This re-calibration may be done electronically by adjusting the sensitivity of the electronic scale 40 in FIG. 2. Such re-calibration can also be done mathematically by simply multiplying the reading of the scale 40 in FIG. 2, for example, by a factor of two when food having a known caloric content of eight calories per gram is placed at the four calories per gram position on the plate 48.

In the alternative, the caloric content of foods from 0–8 calories/gram may be accommodated by simply placing them at indicia corresponding to one-half the normal value.

In FIG. 6 there is illustrated a preferred food and beverage caloric density chart which can be used in connection with the dietary scale arrangement of the present invention. Referring to the figure, a semi-circular area 48a, denoting one half of the flat portion of the plate 48, is depicted in association with various types of foods and beverages. The calories per gram of each type of food or beverage is correlated with the corresponding one of the transverse lines 56a which correspond to the lines 56 of the plate 48, so that the user can visualize the food zones of the plate 48 in which each type of food should be placed.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. Apparatus for determining the caloric content of an entire meal comprising:
   (a) a base support structure;
   (b) a common planar support structure adapted to support a plurality of food components of different caloric density and including means pivotally mounted on said base support structure; and
   (c) scale means connected to said pivotally mounted means at a point remote from said pivotal mounting thereof for weighing said plurality of food components which are positioned on said planar support structure, said scale means including means for indicating the total caloric content of said plurality of food components.

2. The apparatus of claim 1, wherein said planar support structure includes indicia corresponding to foods having different calories per gram, said indicia determining where said plurality of food components are to be positioned.

3. The apparatus of claim 2, wherein the indicia corresponding to the lowest calories per gram is nearest said pivotal mounting and the indicia corresponding to the highest calories per gram is nearest said connection point.

4. The apparatus of claim 1, which includes a plate adapted to be mounted on said planar support structure at a predetermined location thereon, said plate having parallel lines thereon indicating food positioning zones corresponding to food components of different calories per gram, said lines extending parallel to the pivot line of said planar support structure when said plate is positioned at said predetermined location thereon.

5. The apparatus of claim 4, which includes interlocking means on said plate and said planar support structure for facilitating location of said plate at said predetermined location on said planar support structure.

6. The apparatus of claim 4, wherein said plate is provided with means defining a series of parallel zones extending at right angles to a line between said pivotal mounting and the point at which said scale means is connected to said plate support structure, the zones which are progressively farther away from said pivotal mounting being adapted to receive food of progressively higher calories per gram.

7. The apparatus of claim 6, wherein said plate is provided with demarcation lines in the surface thereof which define said series of parallel zones.

8. The apparatus of claim 4, which includes means for compensating for the weight of an empty plate or other food container positioned on said planar support structure.

9. The apparatus of claim 8, wherein said compensating means includes a mechanical counterbalancing assembly connected to said planar support structure and including a movable member which may be adjusted to compensate for the weight of an empty plate or other food container on said planar support structure.

10. The method of measuring the caloric content of an entire meal, which comprises the steps of:
    (a) arranging food on a plate in different parallel zones extending at right angles to a line connecting two opposite sides of the plate, the calories per gram of food placed in said different zones increasing from one side of the plate to the other;
    (b) placing said food carrying plate on a pivotally mounted member with the zone thereof corresponding to the least calories per gram being positioned adjacent the pivoted end of said member, and
    (c) weighing said food carrying plate by connecting a scale to said pivotally mounted member at a point remote from said pivoted end thereof.

11. The method of claim 10, which includes the step of placing an empty plate on said pivotally mounted member and counter-balancing said member to compensate for the weight of said empty plate.

12. The method of claim 10, which includes the step of indicating the total caloric content of the food on said plate based on the weight thereof as measured at said remote point on said member.

13. The method of measuring the caloric content of an entire meal, which comprises the steps of:
    (a) arranging food on a plate in different parallel zones extending at right angles to a line connecting two opposite sides of the plate, the calories per gram of food placed in said different zones increasing from one side of the plate to the other;
    (b) placing said food carrying plate on a pivotally mounted member with the zone thereof corresponding to the least calories per gram being positioned adjacent the pivoted end of said member, and
    (c) weighing said food carrying plate by connecting a scale to said pivotally mounted member at a point adjacent the zone of said plate corresponding to the greatest calories per gram.

14. The method of measuring the total caloric content of a combination of food components, which comprises the steps of:

(a) placing food components of different caloric densities in different zones on a plate, said zones being spaced from one edge of said plate at distances corresponding to said caloric densities represented thereby;

(b) placing said plate with said food components thereon on a pivotally mounted member with said one edge thereof adjacent the pivoted end of said member; and (c) weighing said food components by connecting a scale to said pivotally mounted member at a point remote from said pivoted end thereof.

15. The method of claim 14, which includes the step of indicating the total caloric content of said food components on said plate based on the weight thereof as measured at said remote point on said member.

* * * * *